United States Patent
Ohuchi et al.

(10) Patent No.: US 6,519,932 B2
(45) Date of Patent: *Feb. 18, 2003

(54) EXHAUST GAS PURIFICATION APPARATUS AND METHOD FOR AN INTERNAL COMBUSTION ENGINE

(75) Inventors: Hirofumi Ohuchi, Tokyo (JP); Satoshi Wachi, Tokyo (JP); Hideaki Katashiba, Tokyo (JP); Tosiaki Yonekura, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,976

(22) Filed: Nov. 12, 1999

(65) Prior Publication Data

US 2002/0053200 A1 May 9, 2002

(30) Foreign Application Priority Data

Jun. 10, 1999 (JP) .............. 11-163588

(51) Int. Cl.$^7$ .............. F01N 3/00
(52) U.S. Cl. .............. 60/285; 60/274; 60/286; 60/301
(58) Field of Search .............. 60/285, 286, 295, 60/301

(56) References Cited

U.S. PATENT DOCUMENTS

| | | | | |
|---|---|---|---|---|
| 4,526,001 A | * | 7/1985 | Burns et al. | 60/285 |
| 5,207,058 A | * | 5/1993 | Sasaki et al. | 60/286 |
| 5,423,181 A | * | 6/1995 | Katch et al. | 60/285 |
| 5,437,153 A | * | 8/1995 | Takeshima et al. | 60/285 |
| 5,450,722 A | * | 9/1995 | Takeshima et al. | 60/285 |
| 5,473,890 A | * | 12/1995 | Takeshima et al. | 60/286 |
| 5,483,795 A | * | 1/1996 | Katoh et al. | 60/285 |
| 5,577,382 A | * | 11/1996 | Kihara et al. | 60/276 |
| 5,713,199 A | * | 2/1998 | Takeshima et al. | 60/277 |
| 5,746,989 A | * | 5/1998 | Murachi et al. | 423/213.7 |
| 5,771,686 A | * | 6/1998 | Pischinger et al. | 60/286 |
| 5,775,099 A | * | 7/1998 | Ito et al. | 60/286 |
| 5,839,275 A | * | 11/1998 | Hirota et al. | 60/285 |
| 5,848,529 A | * | 12/1998 | Katoh et al. | 60/285 |
| 5,956,948 A | * | 9/1999 | Nagashima et al. | 60/277 |
| 5,974,791 A | * | 11/1999 | Hirota et al. | 60/286 |
| 5,975,046 A | * | 11/1999 | Kaneko et al. | 60/285 |
| 5,992,141 A | * | 11/1999 | Berriman et al. | 60/286 |
| 5,992,144 A | * | 11/1999 | Takanohashi et al. | 60/285 |
| 6,016,653 A | * | 1/2000 | Glassey et al. | 60/286 |
| 6,041,591 A | * | 3/2000 | Kaneko et al. | 60/285 |
| 6,058,700 A | * | 5/2000 | Yamashita | 60/285 |
| 6,148,612 A | * | 11/2000 | Yamashita et al. | 60/285 |
| 6,185,929 B1 | * | 2/2001 | Ishizuka et al. | 60/285 |
| 6,199,374 B1 | * | 3/2001 | Hirota | 60/277 |
| 6,244,046 B1 | * | 6/2001 | Yamashita | 60/285 |

FOREIGN PATENT DOCUMENTS

| | | | | |
|---|---|---|---|---|
| DE | 197 41 079 | | 4/1999 | |
| JP | 406066135 | * | 3/1994 | 60/301 |
| JP | 2600492 | | 4/1997 | F01N/3/08 |

* cited by examiner

Primary Examiner—Thomas Denion
Assistant Examiner—Diem Tran
(74) Attorney, Agent, or Firm—Sughrue Mion, PLLC

(57) ABSTRACT

In order to suppress the quantity of the nitrogen oxide to be released to the atmosphere when the operation state is shifted from the engine operation with lean air fuel ratio to that with stoichiometric air fuel ratio, the exhaust gas purification apparatus is arranged such that by forced rich operation, when the operation state is shifted from the engine operation with lean air fuel ratio to that with stoichiometric air fuel ratio, the operation state is shifted to the engine operation with stoichiometric air fuel ratio after performing that with rich air fuel ratio.

15 Claims, 14 Drawing Sheets

FIG. 12(A) CRANK ANGLE SIGNAL (1° CA)

FIG. 12(B) REFERENCE ANGLE SIGNAL

FIG. 12(C) FUEL INJECTION

EXHAUST GAS PURIFICATION APPARATUS AND METHOD FOR AN INTERNAL COMBUSTION ENGINE

BACKGROUND OF THE INVENTION

1. Field of the Invention

The present invention relate to an exhaust gas purification apparatus for an internal combustion engine with a use of a catalyst.

2. Description of the Prior Art

In a lean burn engine for purification of exhaust gas, a NOx catalysis which is called NOx occlusion type or selective reduction type is used. A NOx occlusion catalyst stores NOx contained in the exhaust gas when air fuel ratio is lean and exhausts the stored nitrogen oxide NOx when air fuel ratio is rich, and thus hydrocarbon HC and carbon monoxide CO contained in the exhaust gas are purified by the reducing agent. This is to say that in a lean combustion engine, by arranging the NOx catalyst at some intermediate position of the exhaust pipe and performing repeated engine operation with lean air fuel ratio and the one with rich air fuel ratio, the NOx can be purified. For example, the exhaust gas purification apparatus for an internal combustion engine as disclosed by Japanese Laid Open Patent Application No. 2600492, in order to release nitrogen oxide NOx from the NOx catalyst during the operation of the engine operation with rich air fuel ratio with fully loaded, during the engine operation with stoichiometric air fuel ratio under being accelerated or when the occlusion capacity of the NOx catalyst is saturated, the internal combustion engine is driven in periodic engine operation with rich air fuel ratio and the one with stoichiometric air fuel ratio.

Also it is known that in a lean combustion engine, controlling an air fuel ratio to a predetermined air fuel ratio is performed depending on an operation state, such that during a partially loaded operation in order to improve the fuel consumption performance and the exhaust gas purification, the engine operation with lean air fuel ratio and the one with stoichiometric air fuel ratio are performed, and during a fully loaded operation, in order to assure a sufficient output, the engine operation with rich air fuel ratio is performed.

In an air fuel ratio control of a conventional lean combustion engine, because of direct shift to the engine operation with stoichiometric air fuel ratio from the one with lean air fuel ratio, it is possible that an incompletely purified NOx is released momentarily to the atmosphere as shown by FIG. 2E when the engine operation state is shifted to the engine operation with stoichiometric air fuel ratio from the one with lean air fuel ratio; this is supposed to be attributed to the factors ①~③ as follows: ① the NOx catalyst releases the occluded gas in the form of $Ba(NO_3)_2 \rightarrow BaO + 2NO + 3O_2/2$. ② In the engine operation with stoichiometric air fuel ratio the reducing agent such as hydrogen carbon HC and carbon monoxide CO is in shortage. ③ When the air fuel ratio stays near the engine operation with stoichiometric air fuel ratio, formation of NOx increases more than it dose under the engine operation with lean air fuel ratio.

The present invention is made in order to solve foregoing problems and provides an exhaust gas purification apparatus for an internal combustion engine with a capability of suppressing the release of the nitrogen oxide to the atmosphere when the engine operation state is shifted to the engine operation with stoichiometric air fuel ratio from the one with lean air fuel ratio.

SUMMARY OF THE INVENTION

According to the invention, an exhaust gas purification apparatus for an internal combustion engine comprising a NOx catalyst arranged in an exhaust gas passage of the internal combustion engine and an air fuel ratio control means in which one of operations among the engine operation with lean air fuel ratio, the one with stoichiometric air fuel ratio and the one with rich air fuel ratio is selected depending on an operation state, the air fuel ratio control means comprises a means for forced engine operation with rich air fuel ratio, for shifting the engine operation to the one with stoichiometric air fuel ratio after performing the engine operation with rich air fuel ratio when the operation state is shifted from the engine operation with lean air fuel ratio to the one with stoichiometric air fuel ratio.

According to the invention, in an exhaust gas purification apparatus for an internal combustion engine, a period during which the forced engine operation with rich air fuel ratio can be performed is dependent on a degree of richness.

According to an embodiment of the invention, in an exhaust gas purification apparatus for an internal combustion engine, the air fuel ratio under the forced engine operation rich air fuel ratio can be set to be within a range from 13.2 through 14.2.

According to an embodiment of the invention, in an exhaust gas purification apparatus for an internal combustion engine comprising a NOx catalyst arranged in an exhaust gas passage of the internal combustion engine and an air fuel ratio control means in which one of operations among the engine operation with lean air fuel ratio, the one with stoichiometric air fuel ratio and the one with rich air fuel ratio is selected depending on an engine operation state, the air fuel ratio control means comprises combustion fuel injection means for performing an additional fuel injection during an expansion stroke or an exhaust stroke when the operation state is shifted from engine operation with the lean air fuel ratio to the one with stoichiometric air fuel ratio.

According to an embodiment of the invention, in an exhaust gas purification apparatus for an internal combustion engine, a quantity of fuel to be additionally injected is set to be less than that of a reducing agent corresponding to the quantity of NOx occluded by said NOx occlusion catalyst.

According to an embodiment of the invention, in an exhaust gas purification apparatus for an internal combustion engine comprising a NOx catalyst arranged in an exhaust gas passage of the internal combustion engine and an air fuel ratio control means in which one of operation among the engine operation with lean air fuel ratio, the one with stoichiometric air fuel ratio and the one with rich air fuel ratio is selected depending on the engine operation state, the air fuel ratio control means comprises a means for forced engine operation with rich air fuel ratio for performing, when the engine operation state is shifted from the engine operation with lean air fuel ratio to the one with stoichiometric air fuel ratio, at first shifting the engine operation state to said engine operation with stoichiometric air fuel ratio after performing the one with rich air fuel ratio and performing thereafter an additional fuel injection during an expansion stroke or an exhaust strokes.

DESCRIPTION OF THE PREFERRED EMBODIMENT

Embodiment 1

Figure 1:
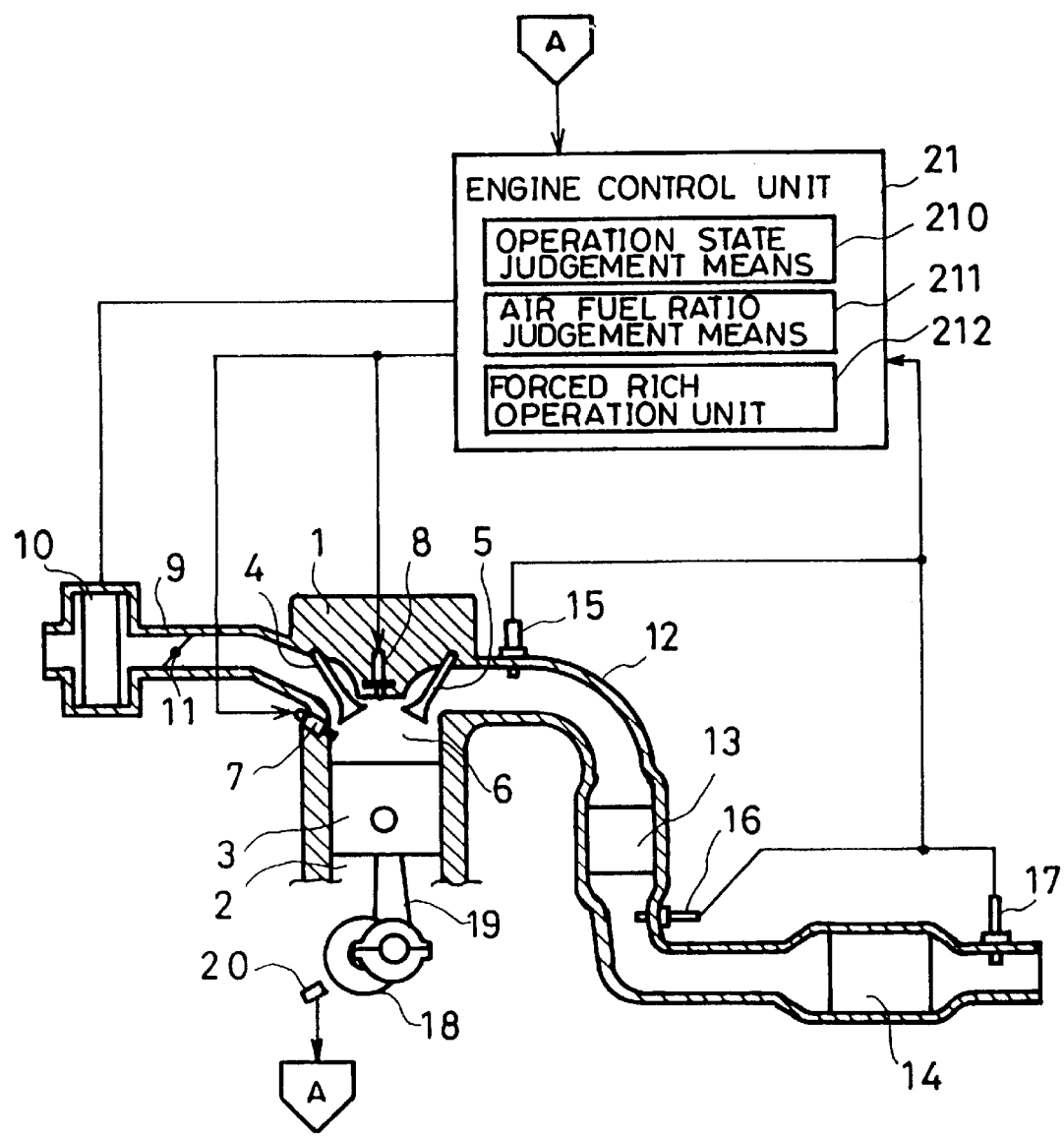
FIG. 1 is a schematic diagram of the Embodiment 1 of the present invention.

A description will be given on the Embodiment 1 of the present invention with reference to FIG. 1~FIG. 5. FIG. 1 is a schematic diagram showing an exhaust gas purification apparatus for an internal combustion engine. In FIG. 1, 1 is an internal combustion engine, 2 is a cylinder of the internal combustion engine 1, 3 is a piston placed in the cylinder 2, 4 is an intake valve of the internal combustion engine 1, 5 is an exhaust valve of the internal combustion engine 1, 6 is a combustion chamber enclosed by the cylinder 2, the piston 3, the intake valve 4 and the exhaust valve 5, 7 is an injector for injecting fuel into the combustion chamber 6, 8 is an ignition plug for igniting the mixture gas within the combustion chamber 6, 9 is an inlet pipe connected to an intake part which is opened and closed by the intake valve 4 of the internal combustion engine 1, 10 is an air quantity sensor arranged on the upstream side of and within the inlet pipe 9, 11 is a throttle valve arranged on the downstream side and within the inlet pipe 9 for controlling quantity of air to be took into the combustion engine 1, 12 is an exhaust pipe connected to an exhaust port opened and closed by the exhaust valve of the internal combustion engine 1, 13 is a teranary agent arranged on the upstream side of and within the exhaust pipe 12, 14 is a NOx catalyst arranged on the downstream side of and within the exhaust pipe 12, 15 is an air fuel ratio sensor arranged between the exhaust valve 5 and the teranary reducing agent 13 within the exhaust pipe 12, 16 is an air fuel ratio sensor arranged between the teranary reducing agent 13 and the NOx catalyst 14 within the exhaust valve 12, 17 is an air fuel ratio sensor arranged on the more downstream side of the NOx catalyst within the exhaust pipe 12, 18 is a crank shaft of the internal combustion engine 1, 19 is a connecting rod connecting between the piston 3 and the crank shaft 18, 20 is a rotation sensor for detecting the rotation speed of the crank shaft as the engine rotation speed, 21 is an engine control unit called ECU within which a digital computer is stored and this engine control unit 21 drives the injector 7 and the ignition plug 8 based on signals brought from various sensors according to the processings specified by a program. The engine control unit 21 according to the Embodiment 1 comprises an operation state judgement means 210, an air fuel ratio control judgement means 211 and a forced rich operation means 212. Those engine operation state judgement means 210, air fuel ratio control means 211 and means for forced engine operation with rich air fuel ratio respectively perform the air fuel ratio control as shown by FIG. 4 through operation of CPU based on the program stored in a ROM with a use of RAM as a memory means.

Figure 3:
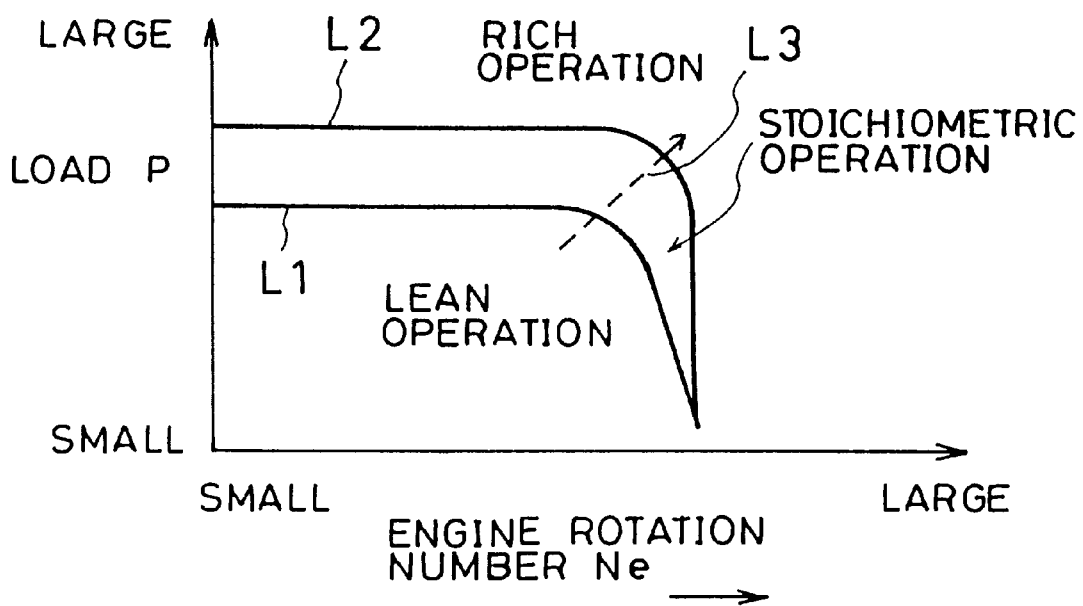
FIG. 3 shows a map for the Embodiment 1 of the present invention.
Figure 4:
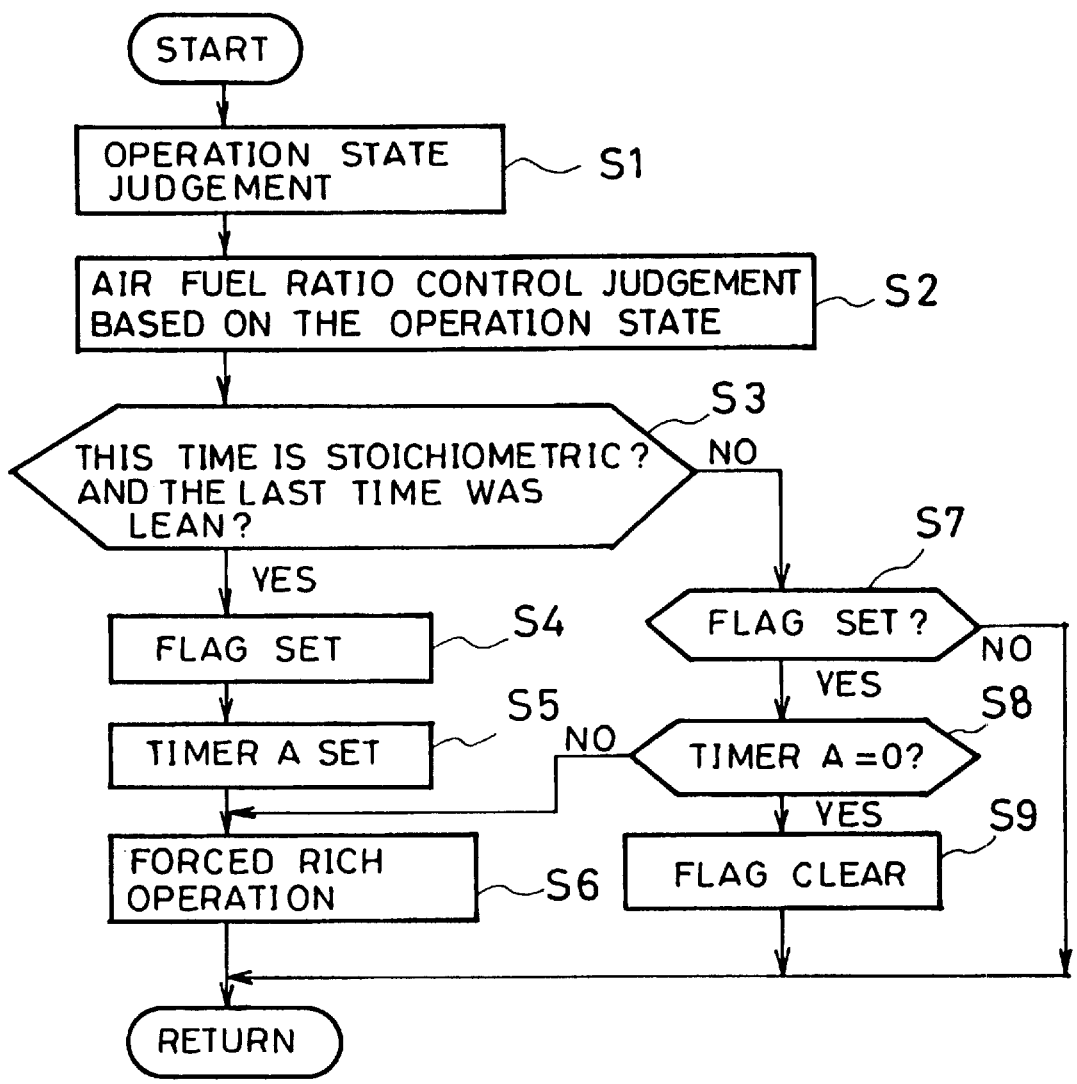
FIG. 4 is a flow chart of the Embodiment 1 of the present invention.

FIG. 3 shows a map used for the air fuel ratio control of the engine control unit 21. The air fuel ratio varies depending on the engine operation state of the internal combustion engine 1 and therefore FIG. 3 is arranged such that the engine rotation number Ne is taken along the axis of abscissa and load P which is a parameter representing an engine load such as filling efficiency is taken along the axis of ordinate. In the air fuel ratio control, the operation state is determined by correlating the load P which is computed based on input signals from the air quantity sensor 10 and air fuel ratio sensors 15~17 and the engine rotation number Ne based on the input signal from the rotation sensor 20 with the map as given by FIG. 3. In FIG. 3, the low load operation area located on the side of low load from the real line is set to be the engine operation with lean air fuel ratio, the high load operation area between the real lines L1 and L2 is set to be the engine operation with stoichiometric air fuel ratio and the fully loaded operation on the load higher than the one represented by the real line L2 is set to the engine operation with rich air fuel ratio. Based on the map given by FIG. 3, when the engine rotation number Ne is low and also the load P is low, the lean operation is selected and the air fuel ratio of the mixture gas to be taken into the combustion chamber 6 is set to be lean; when the load is higher than the load P mentioned above, the engine operation with stoichiometric air fuel ratio is selected and the air fuel ratio of the mixture gas to be taken into the combustion chamber is set to a theoretical air fuel ratio (stoichiometry); and under the state where high output is required, i.e., when the engine rotation number Ne is high and also the load P is high, the engine operation with rich air fuel ratio is selected and the air fuel ratio to be taken into the combustion chamber is selected to a thick air fuel mixture (rich). As an example, when the pedal is operated during the engine operation with lean air fuel ratio with an idling rotation of the internal combustion engine 1, the engine rotation number Ne and the load P increases and consequently the engine operation state shifts to the one with stoichiometric air fuel ratio. When a high output is required by operating the pedal further, the engine operation state becomes to be the one with rich air fuel ratio. Transfer through the engine operation with lean air fuel ratio, the one with stoichiometric air fuel ratio and the one with rich air fuel ratio is shown by the dotted line L3 in FIG. 3.

Subsequently a description on the operation of the Embodiment 1 will be given with reference to FIG. 4. FIG. 4 is a flow chart showing control performed at the time when the air fuel ratio is shifted to an engine operation with stoichiometric air fuel ratio from the one with lean air fuel ratio. According to this flow chart at the time when the engine operation state is shifted to the one with stoichiometric air fuel ratio from the one with lean air fuel ratio, the engine operation state is momentarily forced to the one with rich air fuel ratio (hereinafter referred to as forced rich operation) and after that the operation becomes engine operation with stoichiometric air fuel ratio. Now, a description of this forced rich operation will be given. The engine operation as given by FIG. 4 is performed under a predetermined condition e.g. performance of every twenty five second. At the step 1 in FIG. 4, in order to judge the operation state of engine, the engine rotation number Ne and the load P are read out. Next, at the step 2 the air fuel ratio control is judged based on the engine rotation number Ne and the load P using the map 3 as given in FIG. 3. At this time, the engine operation state exhibited during the processing cycle of this time is memorized as the present operation state and the engine operation state exhibited during the processing cycle of the last time is memorized as the last time operation state. After that at the Step 3 whether the engine operation is presently performed with stoichiometric air fuel ratio and whether it was performed with lean air fuel ratio at the last time or not is judged from the memory value of the last time and that of the present time obtained at the Step 2. If the resultant judgement at the Step 3 is such that operation is presently being performed with stoichiometric air fuel ratio and that of the last time was performed with lean air fuel ratio, shift of combustion state has occurred and thus judgement of Yes appears.

At the Step 4, the flag is set to perform the forced rich operation, at the Step 5 the timer A is set, at the Step 6 the forced rich operation is commanded and after that the processing is terminated for the time being. By the next processing starting timing, processings of the Step 1 through the Step 3 are performed. At this moment, it is already judged that the present time is the engine operation with stoichiometric air fuel ratio and the last time was the one with stoichiometric air fuel ratio according to the judgement of the engine operation state: i.e., at the Step 3, judgement of No appears. Therefore at the Step 3, whether the flag is set or not is judged. At this time the flag is already set and consequently at the Step 8 whether the timer A, which is counted down at a predetermined interval by a processing by unmentioned some other routine, is zero or not is judged. This time, if the timer A is not zero the processing is shifted to the Step 6 and the forced rich operation is continued. On the contrary, if the timer A is zero, the flag is cleared at the Step 9. Accordingly, when the processings of the Steps 1~3 and the Steps 7~9 are performed by the next operational timing the flag is cleared and consequently the processing is finished and returned back.

Figure 5:
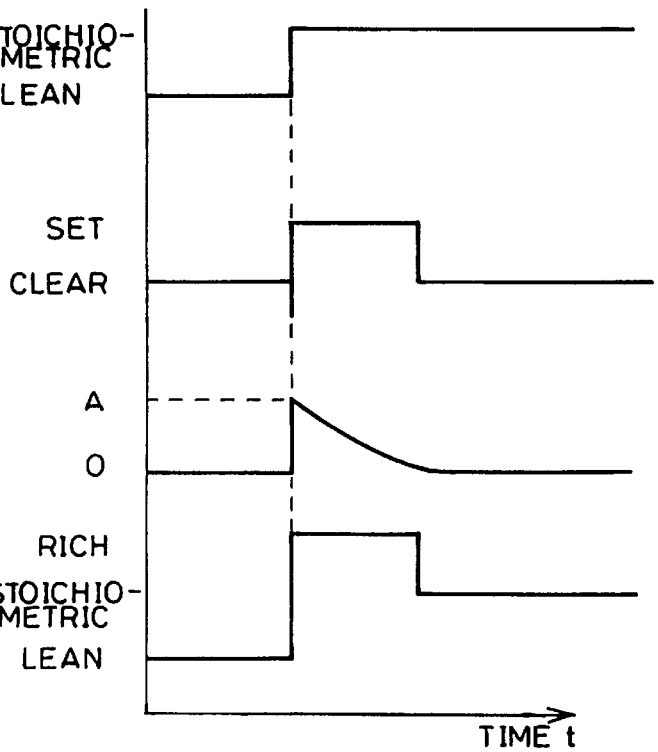
FIG. 5(A), FIG. 5(B), FIG. 5(C) and FIG. 5(D) are time charts of the Embodiment 1 of the present invention.

FIG. 5 is a time chart showing the engine operation performed at the time when the engine operation state is shifted to the one with stoichiometric air fuel ratio from the one with lean air fuel ratio. Referring to FIG. 5 (A), when it is judged that the air fuel ratio control based on the engine operation state is shifted to the one with stoichiometric air fuel ratio from the one with lean air fuel ratio on the basis of the engine rotation number Ne and the load P, the flag changes from clear to set and simultaneously the timer A is set to a predetermined value A from zero and after that the value A is counted down. Simultaneously with the rise of the flag set as above and that of the setting value of timer A to the value A, the engine operation state is shifted to the forced rich operation from the one with lean air fuel ratio. After that the flag is changed from set to clear and when value of the timer A changes from A to zero simultaneously with the foregoing flag change, the engine operation state is shifted to the one with stoichiometric air fuel ratio to the forced rich operation.

Figure 2:
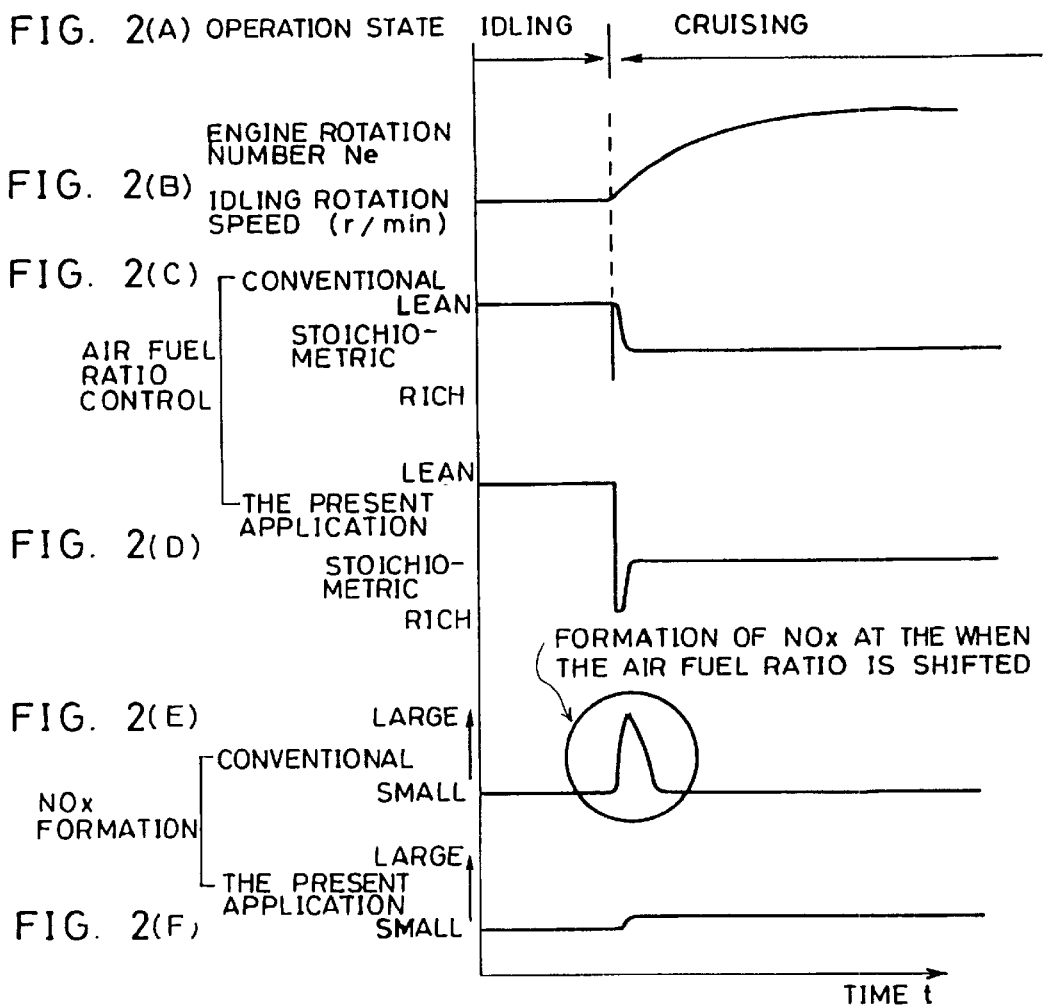
FIG. 2(A), FIG. 2(B), FIG. 2(C), FIG. 2(D), FIG. 2(E) and FIG. 2(F) illustrate the function of the Embodiment 1 of the present invention.

In brief according to the Embodiment 1, when the engine operation state is shifted from the one with lean air fuel ratio to the one with stoichiometric air fuel ratio, shift from the forced rich operation to the one with stoichiometric air fuel ratio is done after the shift from the one with lean air fuel ratio to the forced rich operation is done and consequently the reducing agent of hydrocarbon HC and carbon monoxide CO are supplied to the NOx catalyst 14 during the forced rich operation as mentioned above. Therefore, a temporary release of NOx from the NOx catalyst 14 is suppressed by supply of the reducing agent due to the forced rich operation and thus the temporary release of the NOx is reduced. A description on the matter as mentioned above comparing with aforementioned conventional operation will be given with reference to FIG. 2. When the internal combustion engine 1 as shown by FIG. 2(A) changes from the state of an idling rotation to that of a cruising state by operating the pedal, the engine rotation number Ne increases as shown by FIG. 2(B) and the engine operation state becomes a stoichiometric air fuel ratio after the air fuel ratio control is shifted from the one with lean air fuel ratio to the forced rich operation for a predetermined interval of value A set by the time A as shown by FIG. 2 (D). Therefore as shown by FIG. 2(F), a momentary release of the NOx can be suppressed in the NOx catalyst 14 (see FIG. 1) by virtue of supplying the reducing agent by the forced rich operation. On the contrary in the conventional operation as shown by FIG. 2(C), the air fuel ratio control is directly shifted from the one with lean air fuel ratio to the one with stoichiometric air fuel ratio and consequently a large amount of NOx is released momentarily from the NOx catalyst 14 as shown by FIG. 2(E).

Figure 6:
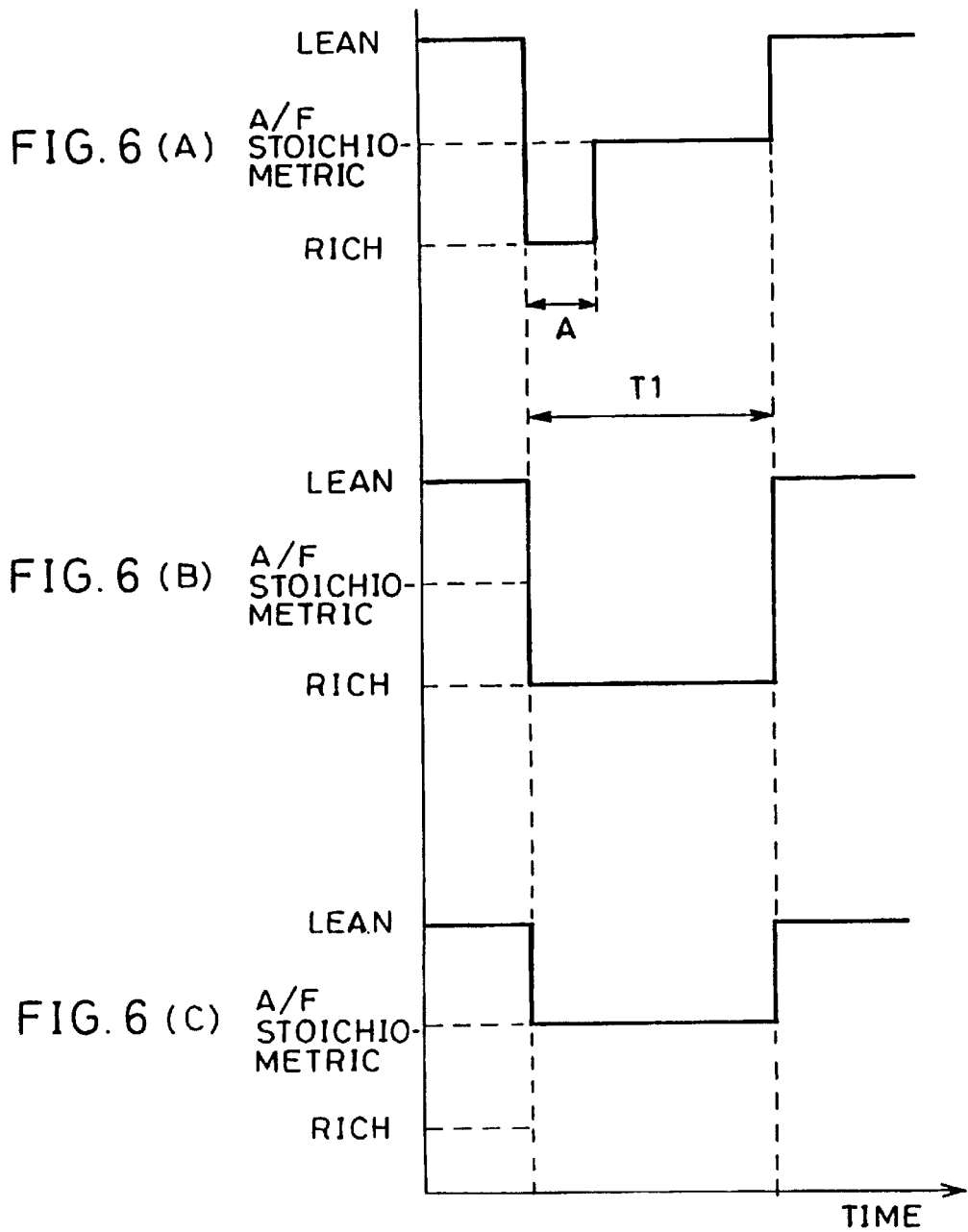
FIG. 6(A), FIG. 6(B) and FIG. 6(C) illustrate the function of the Embodiment 1 of the present invention.

The Japanese Laid-open Patent Application NO.H7-305644 disclosed that the NOx adsorbed to the NOx catalyst can be reduced by shifting to the engine operation with rich air fuel ratio for a predetermined interval from the one with lean air fuel ratio. This conventional operation can be illustrated such that as shown by FIG. 6(B), when the shift from the engine operation with lean air fuel ratio to the rich operation is performed, after carrying out the one with rich air fuel ratio for a predetermined interval of T1, the engine operation is returned to the one with lean air fuel ratio, or as shown by FIG. 6(C) when the operation is shifted from the one with lean air fuel ratio to the one with stoichiometric air fuel ratio, after carrying out the engine operation stoichiometric air fuel ratio for a predetermined interval of T1, the operation is returned to the one with lean air fuel ratio. Therefore, similarly to the foregoing conventional one, the operation disclosed by the Japanese Laid-open Patent Application NO.H7-305667 a large amount of NOx is released momentarily from the aforementioned NOx catalyst 14 as shown by FIG. 2(E). By contrast, according to the Embodiment 1 as shown by FIG. 6(A), when the engine operation state is shifted from the one with lean air fuel ratio to the one with stoichiometric air fuel ratio, after the one with rich air fuel ratio is performed for the interval of value A (interval by the value A <interval of T1) set by the timer A the engine operation is shifted to the one with stoichiometric air fuel ratio and after that the operation is shifted to the stoichiometric operation and after that the engine operation is returned to the one with lean air fuel ratio. Consequently, comparing with the operation disclosed by the Japanese Laid-open Patent Application NO.H7-305644, the operation according to the Embodiment 1 by virtue of the supply of reducing agent by the engine operation with rich air fuel ratio, the temporal release of the NOx can be suppressed (see FIG. 2(F)).

Embodiment 2

Figure 7:
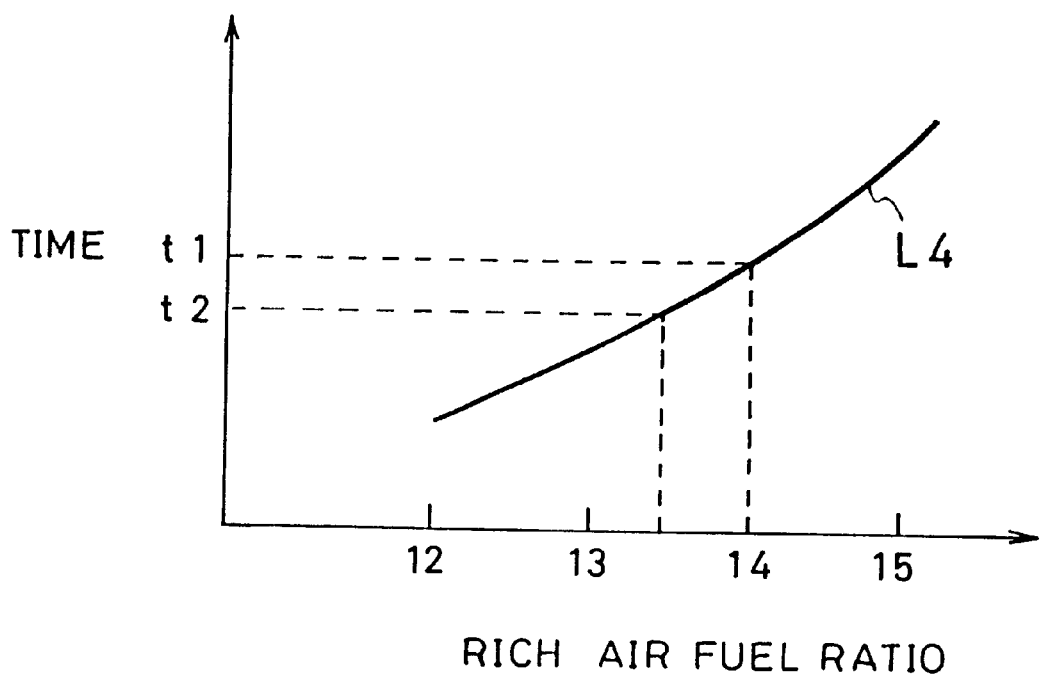
FIG. 7 shows a map for the Embodiment 2 of the present invention.
Figure 8:
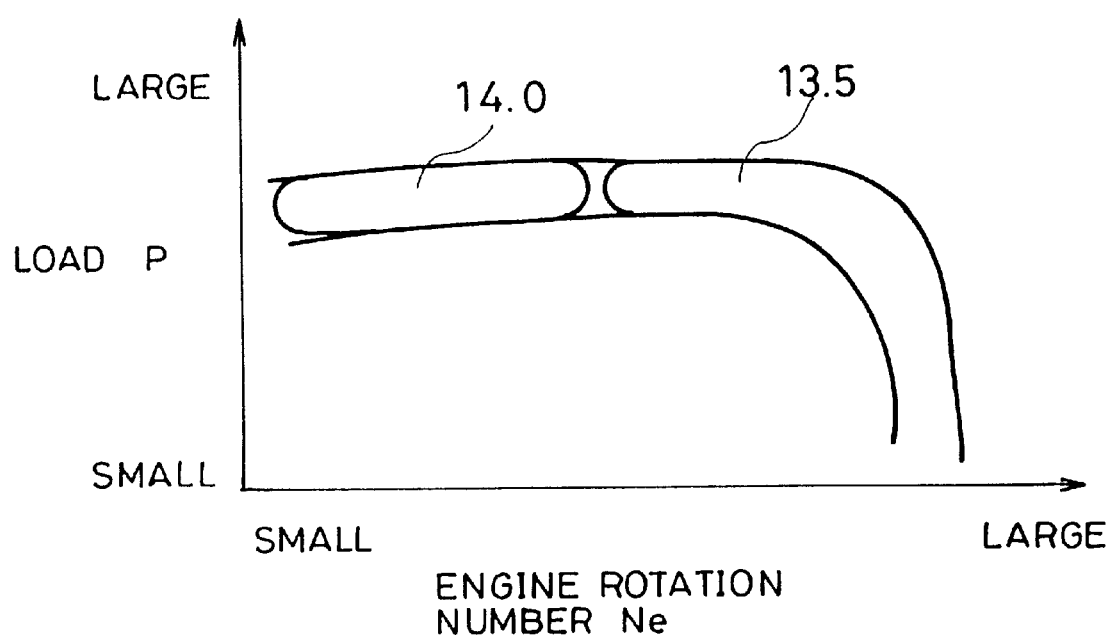
FIG. 8 shows a map for the Embodiment 2 of the present invention.

In the Embodiment 1, though the timer A is set to a constant value of A, depending on the engine operation state the value A, which is a time internal set by the timer A, becomes to be long and in turn the operation time of the forced rich operation is rendered to be long and as a result it may happen that reducing agent such as hydrocarbon HC and carbon monoxide CO becomes excessive. To cope with this situation, in the Embodiment 2 the forced rich control operation is arranged to control the engine operation time depending on the engine operation state. Subsequently a description will be given on the Embodiment 2 with reference to FIG. 7 and FIG. 8. FIG. 7 is a map determining the relation between the rich air fuel ratio and the timer A in the forced rich operation, FIG. 8 is a map determining the relations among the engine rotation number Ne, the load P and the air fuel ratio under the forced rich operation. As shown by FIG. 8, as to the air fuel ratio under the forced rich operation in the region of low rotation speed Ne of the engine, because of a small air quantity of the mixture gas to be supplied to the engine the degree of richness is set to a low valve, e.g. 14.0 and in the region of high rotation speed Ne of the engine because of a large air quantity of the mixture gas to be supplied to the engine, the degree of richness is set to a large value, e.g. 13.5. In this way, when the degree of richness of the air fuel ratio is determined from the engine rotation speed Ne, thus selected degree of richness is correlated as the rich air fuel ratio of FIG. 7 with the real line L as given in FIG. 7, and the time of timer A is selected from the map of FIG. 7: for example, when the degree of richness selected from FIG. 8 is 14.0, the time of timer A is selected to be t1 from the map of FIG. 7 and when the degree of richness selected from FIG. 8 is 13.5, the time of timer A is selected to be t2 (t1>t2) from the map of FIG. 7. By this selection, the forced rich operation time is optimized depending on the operation state and thus an optimum NOx suppressing control can be performed.

Embodiment 3

Figure 9:
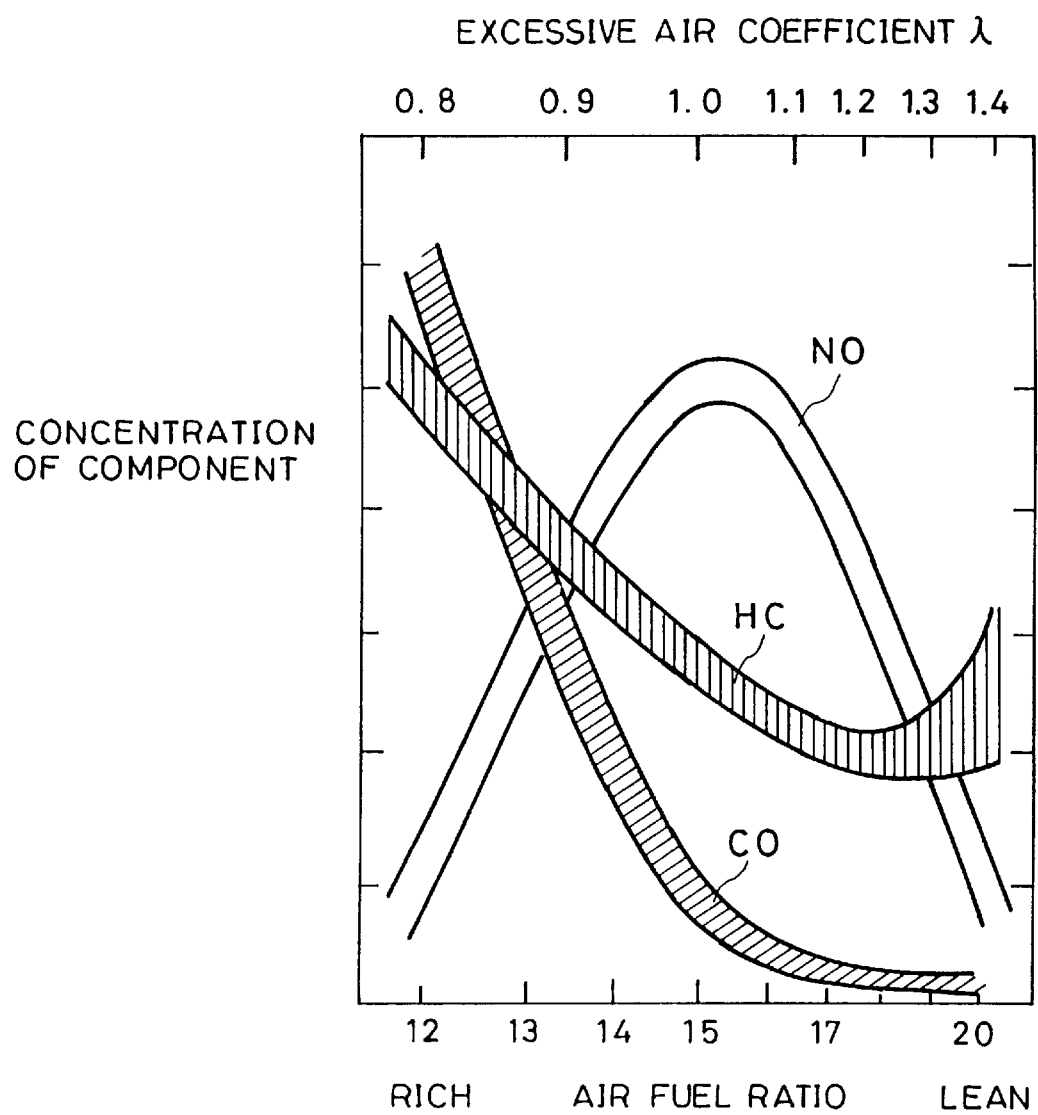
FIG. 9 shows characteristics of the Embodiment 3 of the present invention.

Though in the Embodiment 2, the forced rich operation time is controlled depending on the operation state, formation of the hydrocarbon HC and the carbon monoxide CO should be arranged not to become excessive caused by bringing the air fuel ratio A/F during the forced rich operation to be rich; to satisfy this condition, in the Embodiment 3, an excessive formation of the hydrocarbon HC and the carbon dioxide CO is arranged to be prevented by setting the air fuel ratio A/F during the forced rich operation to the range of 13.2~14.2. FIG. 9 shows an already known formation characteristics of the hydrocarbon HC, the carbon monoxide CO and the nitrogen oxide NOx. As shown by FIG. 9, when the air fuel ratio is thin staying on the lean side of 14.2, the nitrogen oxide NOx increases because of insufficiency of the hydrocarbon HC and the carbon monoxide CO; when the air fuel ratio is thick staying on the rich side of 13.2, the amount of hydrocarbon HC and the carbon monoxide CO increases more than that which is required for suppressing the nitrogen oxide NOx. Therefore, by setting the air fuel ratio A/F under the forced rich operation to the region of 13.2~14.2, it is possible to arrange to prevent the formation of the hydrocarbon HC and the carbon monoxide CO from to be excessive during the forced rich operation.

Embodiment 4

Figure 10:
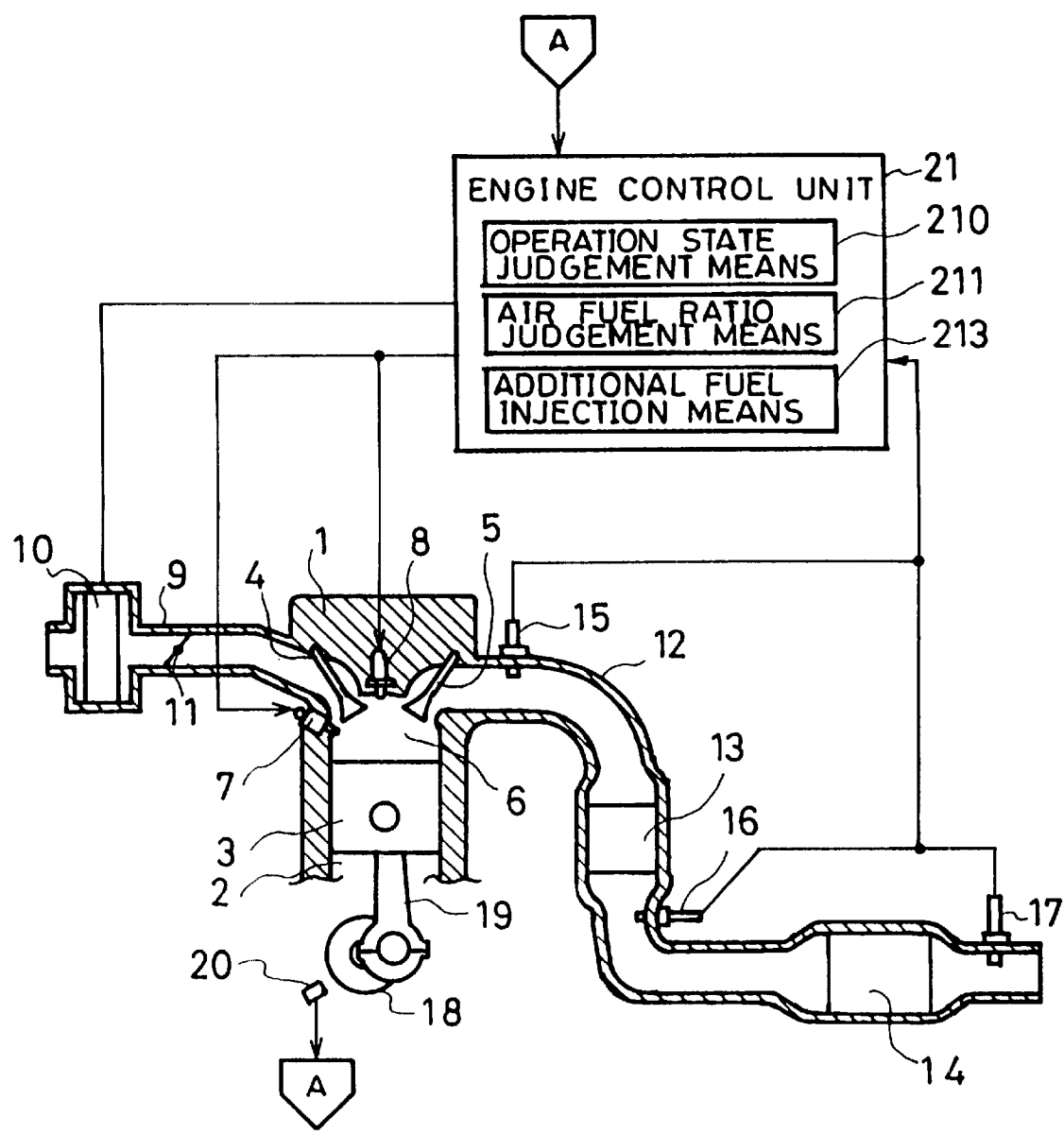
FIG. 10 is a schematic diagram of the Embodiment 4 of the present invention.
Figure 11:
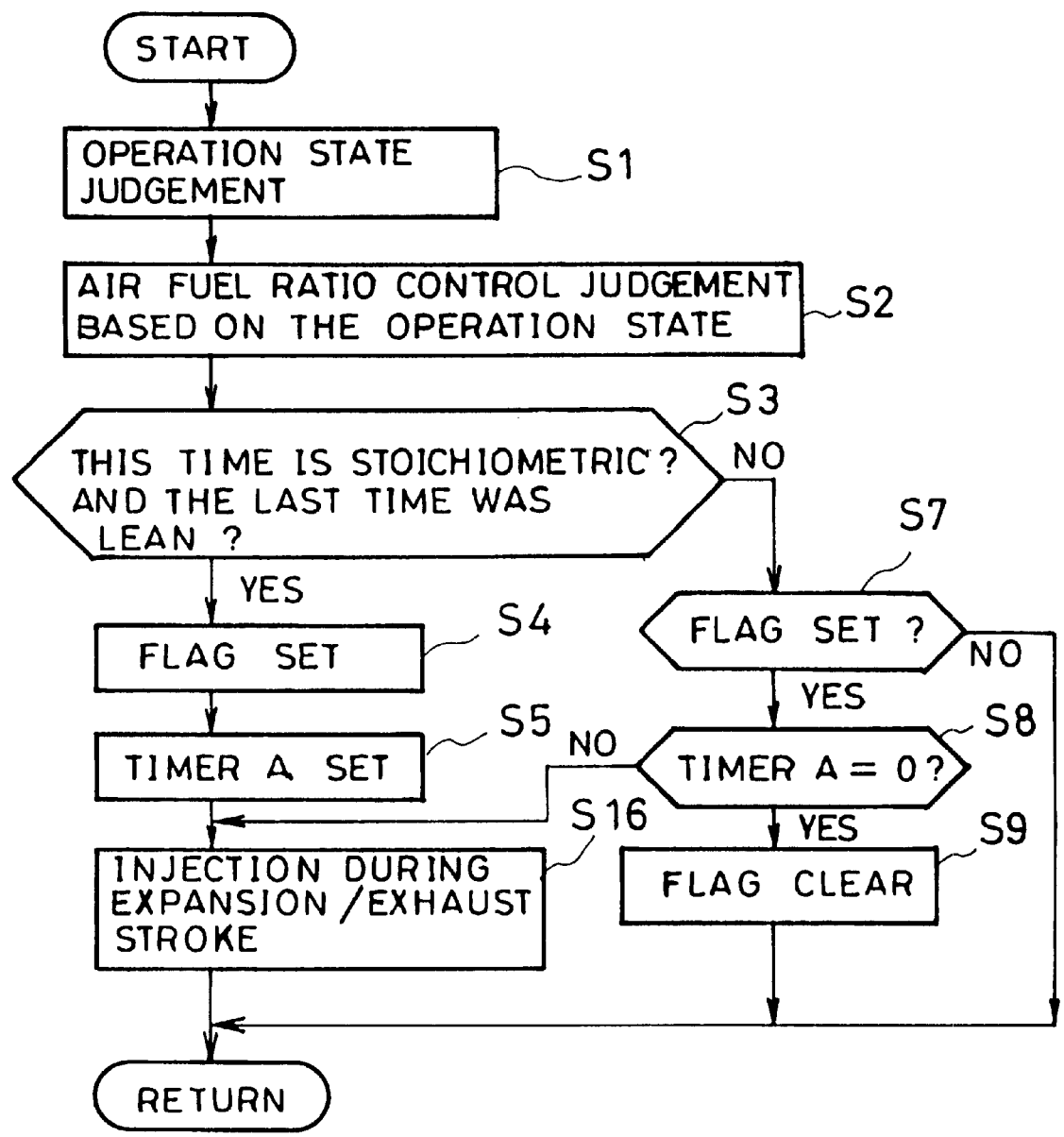
FIG. 11 is a flow chart of the Embodiment 4 of the present invention.

Though in the Embodiment 1, the forced rich operation is employed when the engine operation state is shifted from the one with lean air fuel ratio to the one with stoichiometric air fuel ratio, in the Embodiment 4 as shown by FIG. 10 the engine control unit 21 has an additional fuel injection means 213 in place of the aforementioned forced rich operation unit 212. This additional fuel injection means is provided so that unburnt hydrocarbon HC and carbon monoxide CO are supplied as the reducing agent to the nitrogen oxide NOx catalyst 14 (see FIG. 1) by performing an additional fuel injection at the expansion/exhaust stroke for a predetermined time A of the timer A during the shift of engine operation state from the one with lean air fuel ratio to the one with stoichiometric air fuel ratio. In the Embodiment 4, in place of the foregoing step 4 in FIG. 4, the step 16 in FIG. 11 is used; at this step S16, when the engine operation state is shifted from the one with lean air fuel ratio to the one with stoichiometric air fuel ratio, the fuel injection at expansion/exhaust stroke is performed forcedly. By this operation, in place of the forced rich operation, an additional fuel injection at the expansion/exhaust stroke is performed forcedly.

Figure 12:
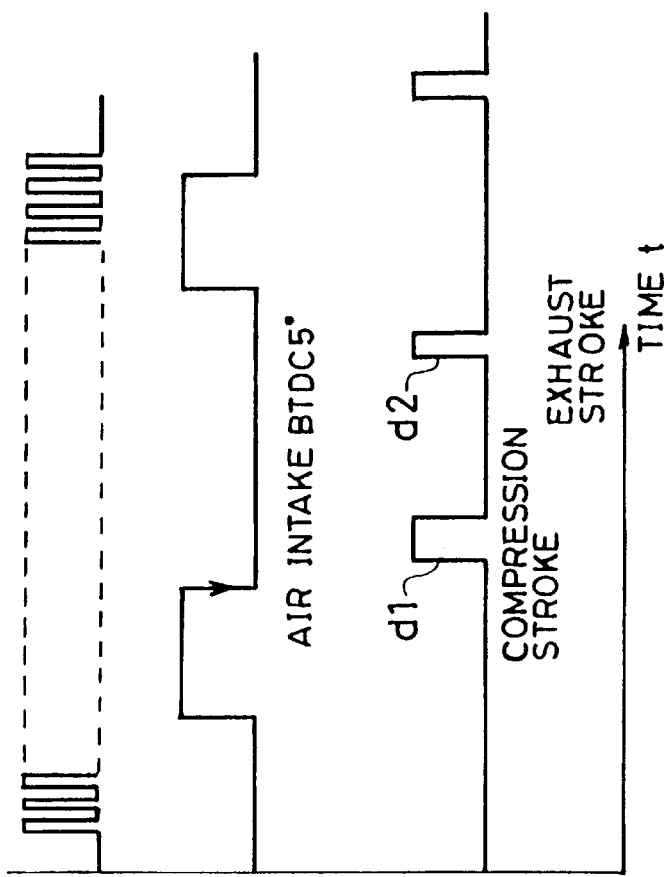
FIG. 12(A), FIG. 12(B) and FIG. 12(C) are time charts of the Embodiment 4 of the present invention.

FIG. 12 is a time chart showing the additional fuel injection at the foregoing expansion/exhaust stroke. In FIG. 12, the output signal of the rotation sensor 20 (see FIG. 1) consists of two signals of a crank angle signal which changes to HI/LO every 1° CA as shown by (A) in FIG. 12 and of a standard angular signal rising up at BTDC5° in the intake stroke in order to know an absolute position information serving as a reference of the control as shown by (B) in FIG. 12. The engine control unit 21 (see FIG. 1) performs the air fuel ratio control according to the operation state on the basis of the map in FIG. 3, determines the fuel quantity so that a predetermined air fuel ratio is obtained from the in take air quantity and if engine operation with lean air fuel ratio is performed, the fuel injection at the expansion stroke as noted by the mark d1 in (C) of FIG. 12 is performed. The injection timing Tinj in this instance is carried out by counting the 1° CA angle from the reference position signal, namely, Tinj= the reference position signal+1° CA signal count valve. And for example, the foregoing fuel injection d1 is started at air intake BTDC3° and the foregoing fuel injection d1 is finished at the expansion stroke 80°; and further the additional fuel injection at the expansion/exhaust stroke as noted by the mark d2 in (C) of FIG. 12 is performed. This additional fuel injection can be realized by counting the 1° CA signal with the injection starting position and the injection termination position previously determined with reference of the 1° CA signal depending on the operation state.

Now, in the past there was a case where the exhaust gas temperature raised as a result of operation such that for the purpose of raising the temperature of the catalyst, fuel is injected additionally during the expansion stroke and the combustion which is carried out during the compression stroke is sustained during the expansion stroke too. Against this example, in the Embodiment 4 an additional fuel injection during the expansion/exhaust stroke is carried out for the purpose of supplying non-burnt fuel, as a NOx reducing agent, to the NOx catalyst 14 (see FIG. 1) and as a result, the fuel injection timing is delayed comparing with the case where the additional fuel injection carried out during the expansion stroke under the sustained combustion and in view of the injection timing the additional fuel injection comes out to be carried out in the vicinity of the exhaust stroke.

Embodiment 5

Figure 13:
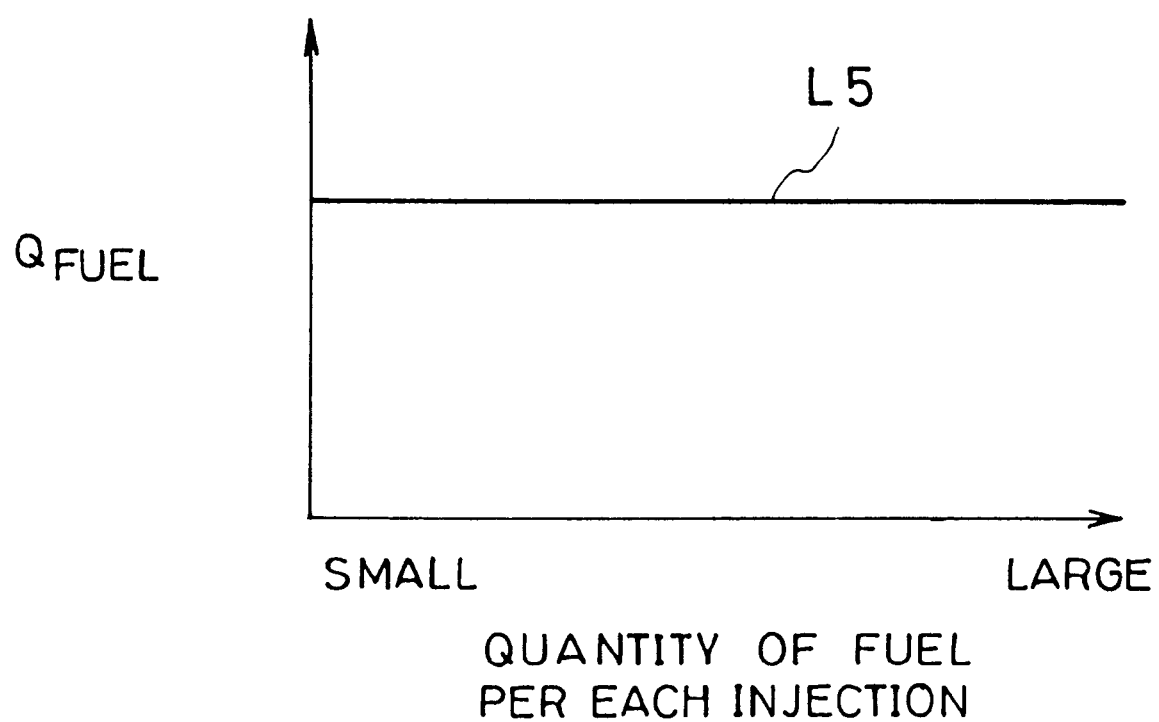
FIG. 13 shows a quantity of the fuel to be injected additionally of the Embodiment 5 of the present invention.

Though in the Embodiment 4, the additional fuel injection is performed during the expansion/exhaust stroke, it is also possible to inject the total fuel quantity Qfuel of the additional fuel injection according to relation as given in FIG. 13: the total fuel quantity Qfuel to be injected is given as the total sum of the time interval given by the timer A (i.e. the number of times of injection) and the fuel quantity per each injection which is given by the formula of Total quantity of additional fuel injection=Qfuel=number of times of injection (N times=interval given by the timer A/rotation period of the engine)×fuel injection quantity [cc] per each injection, and this Qfuel is supposed to be set so as not to exceed a predetermined quantity as shown by the real line L5 in FIG. 13. The total quantity of additional fuel injection Qfuel can be determined experimentally depending on the catalyst and the exhaust system so as not to damage the teranary reducing agent 13 and the NOx catalyst 14 as shown by FIG. 1, and consequently the time interval given by the timer A and the fuel injection quantity per each injection are determined based on the foregoing quantity. Also considering the fact that depending on the engine operation state the intake air quantity may be changed and formation quantity of the NOx and quantity of the Hydrocarbon HC and of carbon monoxide CO as reducing agent also change, the total quantity of the additional fuel injection Qfuel can be changed depending on the engine operation state.

Embodiment 6

Figure 14:
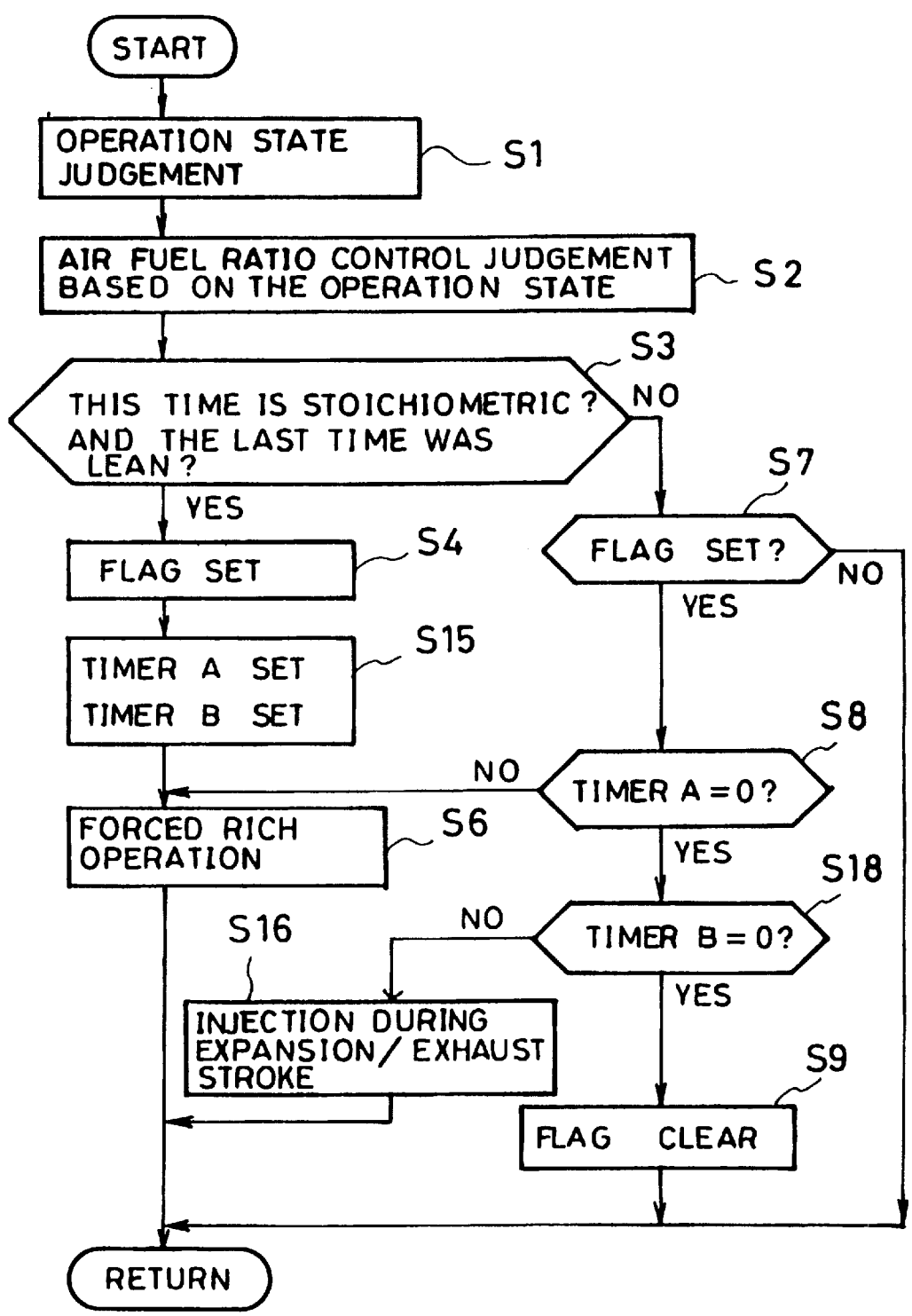
FIG. 14 is a flow chart of the Embodiment 6 of the present invention.

Though in the Embodiment 1, the formation of the NOx is suppressed by the forced rich means, there may be an occasion such that a drive shock occurs because of a large torque caused by the combustion with rich air fuel ratio under a circumstance depending on the setting of the timer A. Also in the Embodiment 4, it is possible to suppress the formation of the NOx independent of the torque during the expansion/exhaust stroke, but on the other hand there may be an occasion such that a drive shock occurs caused by a large stepwise change in the torque because of an insufficiency of torque at the time of shift to the one with stoichiometric air fuel ratio. Thus using two timers as shown by FIG. 14, if the time is within the time by the timer A, the forced rich operation is carried out and after that if within the time by the timer B the expansion/exhaust stroke is carried out, where time by timer A <time by timer B.

As above mentioned, according to the invention, in the air fuel ratio control for making selection among the engine operation with lean air fuel ratio, the one with stoichiometric air fuel ratio and the one with rich air fuel ratio depending on the engine operation state, the engine operation with rich air fuel ratio is performed when the engine operation state is shifted from the one with lean air fuel ratio to the one with stoichiometric air fuel ratio and consequently, a large quantity of the reducing agent is supplied temporarily to the NOx catalyst and thus the release of the nitrogen oxide can be suppressed.

According to the invention, when the forced rich operation is performed the time interval for performing the forced rich operation can be dependent on the degree of richness, and consequently the supply of the reducing agent can be optimized and thus the suppression of the hydrocarbon and of the carbon monoxide can be consistent with that of the release of the nitrogen oxide.

According to the invention, when the forced rich operation is performed the air fuel ratio can be set to the range of 13.2~14.2 and consequently an excessive formation of the hydrocarbon and the carbon monoxide can be prevented.

According to the invention, in the air fuel ratio control in which one of the engine operations among the one with lean air fuel ratio, the one with stoichiometric air fuel ratio and the one with rich air fuel ratio can be selected depending on the engine operation state, when the engine operation state is shifted from the lean operation to the stoichiometric operation, an additional fuel injection is performed during the expansion stroke and the exhaust stroke when the engine operation is shifted from the one with lean air fuel ratio to the one with stoichiometric air fuel ratio and thus the release of the NOx can be suppressed by temporarily supplying the reducing agent when the engine operation state is shifted from the one with lean air fuel ratio to the one with stoichiometric air fuel ratio. Also additional fuel injection is performed during the expansion stroke and the exhaust stroke, the non-burnt fuel as the reduction agent is supplied directly to the NOx catalyst so that the additional fuel is not burnt. Consequently, temporal torque rise of the internal combustion engine will not appear resulting in giving no feeling of degradation of driving ability to a driver.

According to the invention, the quantity of the fuel to be additionally injected during the expansion stroke and the exhaust stroke can be set to be less than that of the reducing agent corresponding to the quantity of the NOx which is occluded in the occlusion catalyst, and as a consequence, the non-burnt fuel can be optimized so that the non-burnt fuel is not burnt in the NOx catalyst and thus it can not be suffered from a damage by burning.

According to the invention, since the fuel injection during the expansion/exhaust stroke is performed after performing the forced rich operation, the torque change at the initial stage can be suppressed by the forced rich operation and the torque change thereafter is suppressed by fuel injection during the expansion/exhaust stroke, and thus reduction of the formation of the NOx can be brought into consistent with the assurance of the driving ability.

What is claimed is:

1. An exhaust gas purification apparatus for an internal combustion engine comprising:
    a NOx catalyst arranged in an exhaust gas passage of said internal combustion engine; and
    air fuel ratio control means for selecting one of an engine operation with lean air fuel ratio, operation with stoichiometric air fuel ratio, and operation with rich air fuel ratio, depending on an engine operation state,
    wherein said air fuel ratio control means temporarily forces engine operation with rich air fuel ratio when said engine operation state is shifted from said engine operation with lean air fuel ratio to said engine operation with stoichiometric air fuel ratio,
    wherein said air fuel ratio control means stops said forced engine operation with rich air fuel ratio based on a signal from a timer, and
    wherein a period during which said forced engine operation with rich air fuel ratio is performed is dependent on a degree of richness of said rich air fuel ratio of said forced engine operation, and said degree of richness is based on either one of or a plurality of a rotation speed of said internal combustion engine, an engine load, and an air quantity.

2. An exhaust gas purification apparatus for an internal combustion engine according to claim 1, wherein said air fuel ratio under said forced operation with rich air fuel ratio is within a range from 13.2 through 14.2.

3. An exhaust gas purification apparatus for an internal combustion engine comprising a NOx catalyst arranged in an exhaust gas passage of said internal combustion engine and air fuel ratio control means in which one of operations among an engine operation with lean air fuel ratio, that with stoichiometric air fuel ratio and that with rich air fuel ratio is selected depending on an engine operation state,
    wherein said air fuel ratio control means causes an additional fuel injection during an expansion stroke or an exhaust stroke when the operation state is shifted from said engine operation with lean air fuel ratio to said engine operation with stoichiometric air fuel ratio,
    wherein said additional fuel injection is provided at a timing to supply non-burnt fuel to said $NO_x$ catalyst, and
    wherein a quantity of fuel to be additionally injected is set to be less than that of a reducing agent corresponding to the quantity of NOx occluded by said NOx catalyst.

4. An exhaust gas purification apparatus for an internal combustion engine comprising:
- a NOx catalyst arranged in an exhaust gas passage of said internal combustion engine; and
- air fuel ratio control means in which one of engine operation with lean air fuel ratio, operation with stoichiometric air fuel ratio, and operation with rich air fuel ratio is selected depending on an engine operation state,
- wherein, when the engine operation state is shifted from said engine operation with lean air fuel ratio to that with stoichiometric air fuel ratio, said air fuel ratio control means first temporarily forces said engine operation with rich air fuel ratio, then causes an additional fuel injection during an expansion stroke or an exhaust stroke to supply non-burnt fuel to said $NO_x$ catalyst, and then shifts the engine operation state to said engine operation with stoichiometric air fuel ratio.

5. A method for exhaust gas purification for an internal combustion engine, comprising the steps of:
- judging an operation state of said engine based on an engine load and an engine rotation;
- determining whether a present operation state has stoichiometric air-to-fuel ratio and whether the previous operation state had a lean air-to-fuel ratio;
- forcing said operation state to have a rich air-to-fuel ratio for a predetermined time if said determination is yes, wherein said predetermined time is based on a signal from a timer;
- controlling the amount of said predetermined time based on a degree of richness of said rich air-to-fuel ratio of said forcing step; and
- controlling said degree of richness based on at least one of a rotation speed of said internal combustion engine, said engine load, and an air quantity.

6. The method as claimed in claim 5, further comprising the step of returning to said stoichiometric air-to-fuel ratio after said predetermined time.

7. The method as claimed in claim 5, wherein said forcing of the operation state to a rich air-to-fuel ratio supplies a reducing agent that suppresses a release of NOx from a NOx catalyst.

8. The method as claimed in claim 5, further comprising the step of setting said rich air-to-fuel ratio to a value in the range 13.2 to 14.2.

9. A method for exhaust gas purification for an internal combustion engine, comprising the steps of:
- judging an operation state of said engine based on an engine load and an engine rotation;
- determining whether a present operation state has stoichiometric air-to-fuel ratio and whether the previous operation state had a lean air-to-fuel ratio;
- forcing said operation state to have a rich air-to-fuel ratio for a predetermined time if said determination is yes, wherein said predetermined time is based on a signal from a timer; and
- performing an injection of an additional amount of fuel to said engine after said predetermined time has lapsed.

10. The method as claimed in claim 9, wherein said injection is performed during an exhaust stroke for the injected cylinder.

11. The method as claimed in claim 10, wherein timing for said injection is based on detecting of a reference position for said exhaust stroke.

12. The method as claimed in claim 11, wherein said timing is delayed based on a sustaining of combustion carried out during said exhaust stroke.

13. The method as claimed in claim 9, wherein said amount of fuel is set so as to not exceed a predetermined quantity.

14. The method as claimed in claim 13, wherein said predetermined quantity is changed depending on an engine operation state.

15. A computer system adapted to control exhaust gas purification for an internal combustion engine, comprising:
- a processor;
- a timer;
- a memory including software instructions adapted to enable the computer system to perform the steps of:
  - judging an operation state of said engine based on an engine load and an engine rotation;
  - determining whether a present operation state has stoichiometric air-to-fuel ratio and whether the previous operation state had a lean air-to-fuel ratio; and
  - forcing said operation state to have a rich air-to-fuel ratio for a predetermined time if said determination is yes, wherein said predetermined time is based on a signal from said timer,
  - wherein the predetermined time is dependent on a degree of richness of said rich air-to-fuel ratio of said forcing step, and said degree of richness is based on at least one of a rotation speed of said engine, said engine load, and an air quantity.

* * * * *